(12) United States Patent
Yamamoto et al.

(10) Patent No.: US 7,898,589 B2
(45) Date of Patent: Mar. 1, 2011

(54) DRIVING APPARATUS FOR DRIVING AN IMAGING DEVICE

(75) Inventors: Shinji Yamamoto, Takatsuki (JP); Toshiya Fujii, Otsu (JP); Kazuyuki Inokuma, Yawata (JP); Tsuyoshi Hasuka, Sakai (JP); Ryoichi Nagayoshi, Nishinomiya (JP); Keijirou Itakura, Ibaraki (JP); Izumi Shimizu, Nagaokakyo (JP)

(73) Assignee: Panasonic Corporation, Osaka (JP)

( * ) Notice: Subject to any disclaimer, the term of this patent is extended or adjusted under 35 U.S.C. 154(b) by 1362 days.

(21) Appl. No.: 10/953,063

(22) Filed: Sep. 30, 2004

(65) Prior Publication Data

US 2005/0062857 A1    Mar. 24, 2005

(30) Foreign Application Priority Data

Oct. 3, 2003  (JP) ................. 2003-346170

(51) Int. Cl.
*H04N 3/14* (2006.01)
*H04N 5/335* (2006.01)

(52) U.S. Cl. ..................... 348/314; 348/230.1

(58) Field of Classification Search .......... 348/143, 348/311, 312, 314, 319, 320, 322
See application file for complete search history.

(56) References Cited

U.S. PATENT DOCUMENTS

| 5,122,850 | A | * | 6/1992 | Burkey | 257/230 |
|---|---|---|---|---|---|
| 5,528,291 | A | | 6/1996 | Oda | |
| 5,729,287 | A | * | 3/1998 | Morimoto | 348/241 |
| 5,828,407 | A | * | 10/1998 | Suzuki | 348/312 |
| 6,559,889 | B2 | * | 5/2003 | Tanaka et al. | 348/299 |
| 6,947,089 | B1 | * | 9/2005 | Hori | 348/312 |
| 6,982,751 | B1 | * | 1/2006 | Tanaka | 348/220.1 |
| 7,102,680 | B2 | | 9/2006 | Mori et al. | |
| 7,161,625 | B2 | * | 1/2007 | Hori | 257/E27.151 |
| 2001/0038064 | A1 | * | 11/2001 | Mori et al. | 250/208.1 |
| 2002/0171752 | A1 | * | 11/2002 | Baer | 348/362 |
| 2003/0030737 | A1 | * | 2/2003 | Yanai | 348/296 |
| 2004/0130641 | A1 | * | 7/2004 | Mabuchi | 348/302 |
| 2005/0179144 | A1 | | 8/2005 | Hori | |
| 2006/0256206 | A1 | | 11/2006 | Mori et al. | |

FOREIGN PATENT DOCUMENTS

| JP | 61-026375 | 2/1986 |
|---|---|---|
| JP | 5-103267 | 4/1993 |
| JP | 9-107505 | 4/1997 |
| JP | 2000-324402 | 11/2000 |
| JP | 2001-69409 | 3/2001 |
| JP | 2002-34048 | 1/2002 |

\* cited by examiner

*Primary Examiner* — Lin Ye
*Assistant Examiner* — Dennis Hogue
(74) *Attorney, Agent, or Firm* — McDermott Will & Emery LLP

(57) ABSTRACT

A drive unit 120 sets a saturation amount in a read period in which charges generated in pixels are read to vertical CCDs to be lower in a combination mode than in an individual mode (see Vsub in count values 22 to 24 in FIG. 6). As a result, excess charges in the pixels are drained to an n-type substrate 11. The drive unit 120 also sets an accumulation period to be shorter in combination mode than in individual mode (see Vsub in each mode in FIG. 6).

30 Claims, 11 Drawing Sheets

FIG.11

|  | OPENING AREA | ACCUMULATION TIME |
|---|---|---|
| INDIVIDUAL MODE | A | T |
| COMBINATION MODE | A/9 | T |

FIG.12

|  | OPENING AREA | ACCUMULATION TIME |
|---|---|---|
| INDIVIDUAL MODE | A | T |
| COMBINATION MODE | A/3 | A/3 |

DRIVING APPARATUS FOR DRIVING AN IMAGING DEVICE

BACKGROUND OF THE INVENTION (1) Field of the Invention

The present invention relates to a driving apparatus for driving an imaging device, and in particular to a driving apparatus for controlling blooming, even when charges generated in each of a predetermined number of individual pixels are added together and output.

(2) Description of the Related Art

CCD (charge coupling device) image sensors have come into wide use in recent years as imaging devices in digital video cameras and digital still cameras. A CCD image sensor uses a CCD to output charges generated in each pixel. In order to improve transfer efficiency, the CCD is divided into a plurality of areas, and each area transfers the charges of a different pixel.

Transferring a plurality of charges at once in this way causes a phenomenon called blooming to occur under certain conditions, and this phenomenon prevents normal image data from being obtained.

Blooming occurs when charges that exceeds the transfer ability of the CCD are read. Charges overflow in the CCD, and affects neighboring signal charges that are being transferred. Blooming is particularly likely to occur when strong spot light is incident on the imaging device.

One means for controlling blooming is a structure in which a saturation amount is set in a range that is within the transfer ability of the CCD, and excessive charges that exceed the saturation amount is drained. This structure is called an overflow drain.

This kind of blooming control is further improved by a technique that changes the saturation amount depending on the situation, rather than setting the saturation amount to a fixed amount (see Japanese patent application publication No. S61-26375).

Meanwhile, an advancement made in recent years in the field of digital video cameras and digital still cameras is an increase in the number of pixels in imaging devices. Taking an example of a CCD image sensor that has 5,000,000 pixels, the number of vertical pixels is approximately 1920 and the number of horizontal pixels is approximately 2560. This is approximately sixteen times the number of an ordinary NTSC CCD imaging sensor. Such an increased number of pixels means that the amount of information to be processed per unit of time also increases. As a result, when taking moving images, information cannot always be processed in time before the moving image is displayed on the monitor.

One way devised to deal with this problem is a combination mode in which the charges generated in each of a predetermined number of the pixels are read and added together, and the resultant charges are then output. In a digital video camera, for example, an individual mode in which the charges from each pixel are output individually is used when taking still images, and the combination mode is used when taking moving images.

However, since the charges of a predetermined number of pixels are added together to generate one signal charge in combination mode, the problem of blooming is likely to arise if the method used to drive the CCD image sensor in combination mode is the same as that used in individual mode.

SUMMARY OF THE INVENTION

In view of the stated problems, the object of the present invention is to provide a technique used in an imaging device in which individual mode and combination mode are selectively switched between, for controlling blooming in both individual mode and combination mode.

In order to achieve the described object, the present invention is a driving apparatus for driving an imaging device that includes a plurality of pixels and a temporary charge storage area, each pixel generating charges depending on an amount of exposure, the driving apparatus driving the imaging device using a combination mode in which charges generated in a predetermined number of the pixels are read to the temporary charge storage area to be added together, the driving apparatus including: a setting unit operable to set a saturation amount in a read period to be lower than when an individual mode is used, the read period being for reading charges generated in the pixels to the temporary charge storage area, the saturation amount being an upper limit of charges that can be accumulated in each pixel, and the individual mode being a mode in which charges generated in each pixel are read to the temporary charge storage area to be stored individually; and a limitation unit operable to limit the amount of exposure to be lower than when the individual mode is used.

According to the preferred embodiment, the driving apparatus sets the saturation amount in the read period to be lower in combination mode than in individual mode, and controls the exposure amount. Here, the driving apparatus is controlling blooming in two aspects.

One aspect is reducing the upper limit of charges that can be accumulated in the pixels in combination mode compared to individual mode. This prevents excessive charges being read to the temporary charge storage area in combination mode even if a strong spot light is incident on the imaging device, because the upper limit of charges that can be accumulated in each pixel is lowered. Note that the purpose of the setting unit is to prevent excessive charges being read to the temporary charges storage area even in combination mode, and therefore, it is sufficient to lower the upper limit of the read period in order to achieve this purpose.

The other aspect is restricting the amount of charges that is generated in the pixels in combination mode compared to individual mode. This prevents excessive charges being generated in combination mode even if a strong spot light is incident on the imaging device, because the amount of exposure of each pixel is restricted.

According to the two stated aspects, the driving apparatus controls the problem of blooming in which charges overflow in the temporary charge storage area.

Here, the setting unit may further set the saturation amount in an accumulation period to be equal to when the individual mode is used, the accumulation period being a period in which the pixels generate charges according to an amount of light received by each pixel.

According to the preferred embodiment, the saturation amount is set to be equal in combination mode and individual mode.

In, for example, an imaging device in which a plurality of cells are formed in the semiconductor substrate and that has an overflow drain structure, the driving apparatus is able to set the saturation amount of the well potential by applying different substrate voltages to the substrate. However, the shape of the well potential also changes when different substrate voltages are applied to the substrate, and consequently, spectral characteristics of the pixels also change. Such changes in spectral properties adversely affect image color reproduction properties.

For this reason, the driving apparatus of the present invention makes the saturation amount during the accumulation period equal in individual mode and combination mode. This maintaining spectral properties of the imaging device and achieves favorable color reproduction properties.

Here, the setting unit may set the saturation amount such that charges obtained as a result of adding the charges of the predetermined number of pixels together do not exceed a maximum storage amount of the temporary charge storage area.

According to the preferred embodiment, the driving apparatus sets the saturation amount in each pixel in individual mode so that the charges do not exceed the maximum holding amount, and sets the saturation amount in each pixel in combination mode so that even when charges from the plurality of cells are added together, the charges do not exceed the maximum holding amount.

Therefore, the driving apparatus controls the problem of blooming in which charges overflow in the temporary charge storage area.

Here, the setting unit may set the saturation amount so as to be 1/n of the saturation amount when the individual mode is used, n being the predetermined number.

According to the preferred embodiment, in a case where, for example, charges of nine pixels are added together in combination mode, the saturation amount will be one ninth of that in individual mode. Therefore, the driving apparatus controls the problem of blooming in which charges overflow in the temporary charge storage area.

Here, the pixels maybe formed in a semiconductor substrate, and have an overflow drain structure by which charges generated in excess of the saturation amount are drained to the semiconductor substrate, the saturation amount may be set such that the lower a substrate voltage provided to the semiconductor substrate is, the higher the saturation amount is, and the setting unit may set the substrate voltage to be higher than when the individual mode is used.

According to the preferred embodiment, the driving apparatus drains excessively generated charges that exceed the saturation amount in the pixels, to the semiconductor.

In this way, excessive charges in the pixels can be drained of by being drained to the semiconductor substrate.

Here, the amount of exposure may correspond to a value of an amount of received light integrated in the accumulation period, and the limitation unit may limit the accumulation period to he shorter than when the individual mode is used.

According to the preferred embodiment, the driving apparatus controls the exposure amount by shortening the accumulation period in the pixels. This enables the driving apparatus to control the problem of blooming in which charges overflow in the temporary charge storage area.

Here, the limitation unit may include: a storage sub-unit operable to store information indicating an accumulation time period that is shorter than when the individual mode is used; a reset sub-unit operable to drain all charges from the pixels; and a read sub-unit operable to read, to the temporary charge storage area, charges generated in the pixels after the accumulation time period indicated by the information stored in the storage sub-unit has elapsed from when the reset sub-unit drains the charges.

According to the preferred embodiment, the driving apparatus reads charges from the pixels after an accumulation period corresponding to the respective mode has elapsed since all charges in the pixels were drained. Here, the accumulation period is shorter in combination mode than in individual mode.

Therefore, the driving apparatus is able to control the exposure amount.

Here, the limitation unit may include: a storage sub-unit operable to store information indicating an accumulation time period that is shorter than when the individual mode is used; and a mechanical shutter that opens only for the accumulation time period indicated by the information stored in the storage sub-unit, to allow the pixels to receive light.

According to the preferred embodiment, the driving apparatus opens the mechanical shutter to have the pixels receive light for only the accumulation period of the respective mode. Here, the accumulation period is shorter in combination mode than in individual mode.

Therefore, the driving apparatus is able to control the exposure amount.

Furthermore, the amount of exposure may correspond to a value of an amount of received light integrated in the accumulation period, and the limitation unit may limit the amount of light received to be lower than when the individual mode is used.

According to the preferred embodiment, the driving apparatus controls the exposure amount by reducing the amount of light received by the pixels. Therefore, the driving apparatus controls the problem of blooming in which charges overflow in the temporary charge storage area.

Here, the limitation unit may include: a storage sub-unit operable to store information indicating an opening rate that is lower than an opening rate when the individual mode is used; and an aperture construction that opens to an extent corresponding to the opening rate indicated by the stored information, to allow the cells to receive light.

According to the preferred embodiment, the driving apparatus opens the aperture construction in accordance with the opening rate for the respective mode to allow the pixels to receive light. Here, the opening rate is smaller in combination mode than in individual mode.

Therefore, the driving apparatus is able to control the exposure amount.

Here, the limitation unit may set the saturation amount to be 1/n of the saturation amount when the individual mode is used, n being the predetermined number.

According to the preferred embodiment, in a case where, for example, charges of nine pixels are added together in combination mode, the amount of exposure will be one ninth of that in individual mode. Therefore, the driving apparatus controls the problem of blooming in which charges overflow in the temporary charge storage area.

Furthermore, the present invention is a driving method for driving an imaging device that includes a plurality of pixels and a temporary charge storage area, each pixel generating charges depending on an amount of exposure, the driving method driving the imaging device using a combination mode in which charges generated in a predetermined number of the pixels are read to the temporary charge storage area to be added together, the driving method including: a setting step of setting a saturation amount in a read period to be lower than when an individual mode is used, the read period being for reading charges generated in the pixels to the temporary charge storage area, the saturation amount being an upper limit of charges that can be accumulated in each pixel, and the individual mode being a mode in which charges generated in each pixel are read to the temporary charge storage area to be stored individually; and a limitation step of limiting the amount of exposure to be lower than when the individual mode is used.

According to the preferred embodiment, the driving method sets the saturation amount in the read period to be lower in combination mode than in individual mode, and controls the exposure amount. This driving method has the same structure as the aforementioned driving apparatus, and therefore achieves the same effects as the driving apparatus.

Furthermore, the present invention is an imaging apparatus that generates charges in each of a plurality of pixels depending on an amount of exposure, and generates image data from the charges in each of the pixels, including: an imaging device that comprises the plurality of pixels; a driving apparatus that drives the imaging device using either of two reading modes, one of the reading modes being an individual mode in which charges generated in each of the pixels is read individually and the other of the reading modes being a combination mode in which charges of a predetermined number of pixels among the plurality of pixels are read to be added together; a signal processing unit operable to generate image data in accordance with charges read from the imaging device in either of the reading modes; and a control unit operable to select one of the individual mode and the combination mode for the driving apparatus, in accordance with an input signal, wherein, the driving apparatus includes: a setting unit operable to operable to set a saturation amount in a read period for reading charges generated in the pixels to a temporary charge storage area to be lower when the combination mode is used than when the individual mode is used, the saturation amount being an upper limit of charges that can be accumulated in each pixel; and a limitation unit operable to limit the amount of exposure to be lower when the combination mode is used than when the individual mode is used.

According to the preferred embodiment, the imaging apparatus achieves the same effects as driving apparatus described above.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 11 shows correspondence between aperture opening area and accumulation time in each of individual mode and combination mode; and FIG. 12 shows correspondence between aperture opening area and accumulation time in each of individual mode and combination mode.

DESCRIPTION OF THE PREFERRED EMBODIMENTS

The following describes preferred embodiments of the present invention with reference to the drawings.

First Embodiment

Overview

The driving apparatus of the first embodiment sets the saturation amount of charges that can be accumulated in each pixel in combination mode to be lower than that in individual mode, as well as shortening the accumulation period in which the pixels generate and accumulate charges in combination mode. This enables the driving unit to control blooming even in combination mode.

<Structure>

Figure 1:
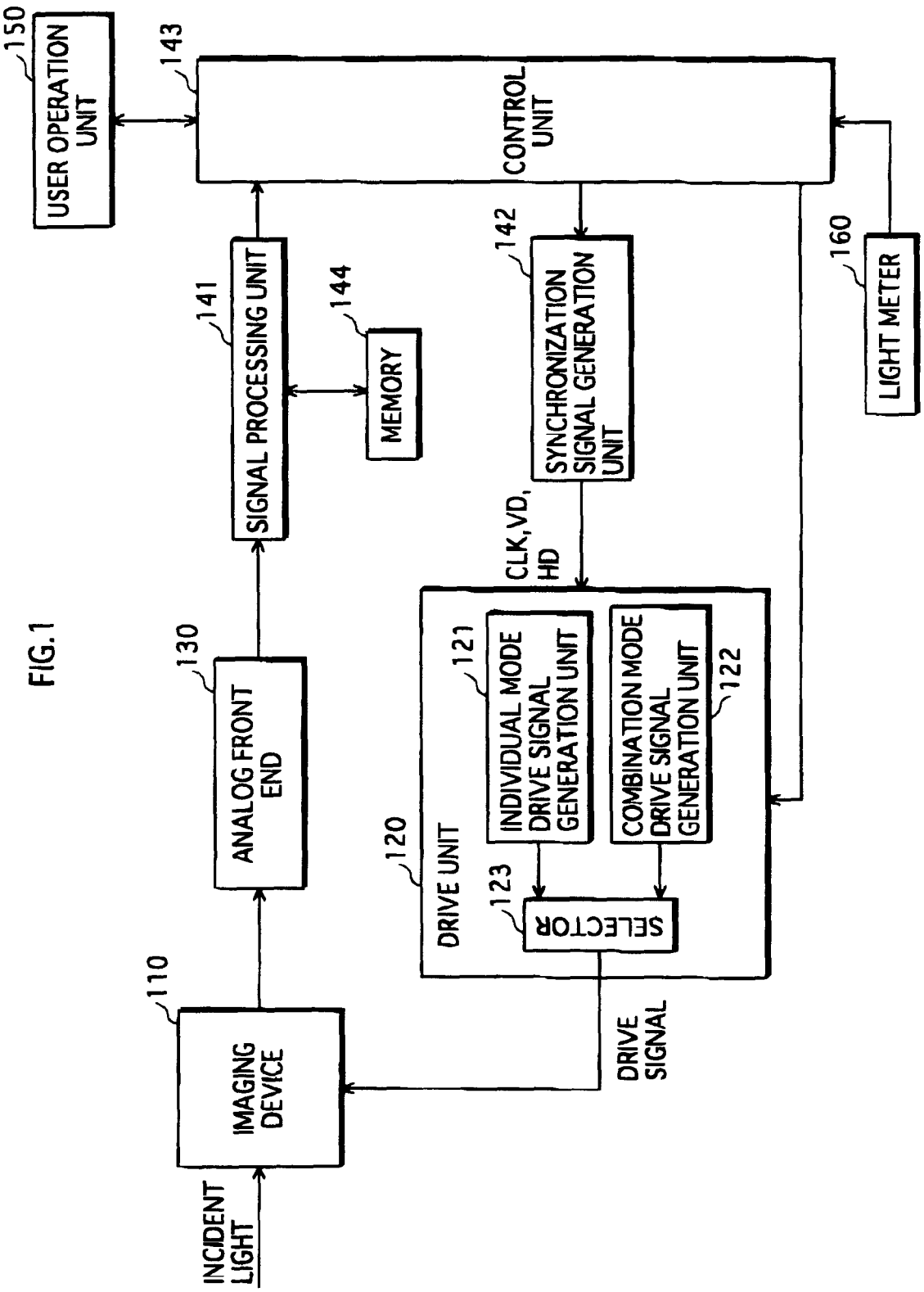
FIG. 1 shows the overall structure (imaging apparatus) of an imaging device, and a driving apparatus therefor, of a first embodiment of the present invention.

FIG. 1 shows the overall structure (imaging apparatus) of an imaging device, and a driving apparatus therefor, of the first embodiment.

An imaging device 110 has a plurality of pixels arranged in a matrix in a semiconductor substrate. Each cell has a color filter corresponding to either R (red), G (green), or B (blue) on a photoreceptor surface thereof, and generates charges corresponding to an amount of light that passes through the color filter and accumulates the generated charges. The accumulated charges are successively output to an analog front end 130 in accordance with a driving signal supplied by a drive unit 120.

The drive unit 120 generates nine types of drive signals for driving the imaging device 110, based on reference signals from a synchronization signal generation unit 142, and supplies each of the generated signals to the imaging device 110. Here, the types of reference signals are a clock signal (CLK), a vertical synchronization signal (VD), and a horizontal synchronization signal (HD). The imaging device 110 has two drive modes: individual mode and combination mode. The drive unit 120 selectively switches between these modes.

In individual mode, charges generated in each pixel are output to the analog front end 130 individually. In combination mode, charges generated in each of a predetermined number of pixels are added together, and resultant charges output to the analog front end 130.

The drive unit 120 includes an individual mode drive signal generation unit 121, a combination mode drive signal generation unit 122, and a selector 123.

The individual mode drive signal generation unit 121 generates nine types of drive signals for driving the imaging device 110 in individual mode.

The combination mode drive signal generation unit 122 generates nine types of drive signals for driving the imaging device 110 in combination mode.

The selector 123 selectively switches between outputting drive signals generated by the individual mode drive signal generation unit 121 and signals generated by the combination mode drive signal generation unit 122. The selector 123 switches according to a mode select signal (Sm) received from a control unit 143.

The analog front end 130 is composed of a CDS (correlated double sampling) circuit and an AGC (auto gain control) conversion circuit, and generates digital signals that are processable by the signal processing unit 141 from the charges output by the imaging device 110.

The signal processing unit 141, using the memory 144, processes signals obtained from the analog front end 130, and generates an image data signal that consists of a luminosity signal and a color phase signal. The memory 144 is, for example, an SDRAM.

The synchronization signal generation unit 142 has an internal clock, and provides reference signals (CLK, VD, HD) generated by the clock to the drive unit 120.

The user operation unit 150 receives operations from the user (for example, presses of the shutter button, and switches between moving image mode and still image mode), and notifies the control unit 143 of each received operation.

The light meter 160 measures the amount of light received by the imaging device 110, and notifies the control unit 143 of a measurement result.

The control unit 143 is, specifically, composed of a CPU, a ROM, and RAM, and so on, and achieves its functions by executing programs stored in the ROM. For example, when an operation is received from the user to switch from moving image mode to still image mode, the control unit 143 outputs a mode select signal indicating individual mode to the drive unit 120. This mode select signal puts the drive unit 120 into a drive stand-by mode for individual mode. When a press of the shutter button is subsequently received from the user, the control unit 143 selects an appropriate shutter speed according to the measurement result from the light meter 160, and outputs parameter information indicating the shutter speed and the like, and a capture start trigger signal, to the drive unit 120 The drive unit 120 provides a drive signal to the imaging device, and capturing of an image consequently commences.

The following describes the structure of the imaging device 110 and the drive unit 120 in detail.

Figure 2:
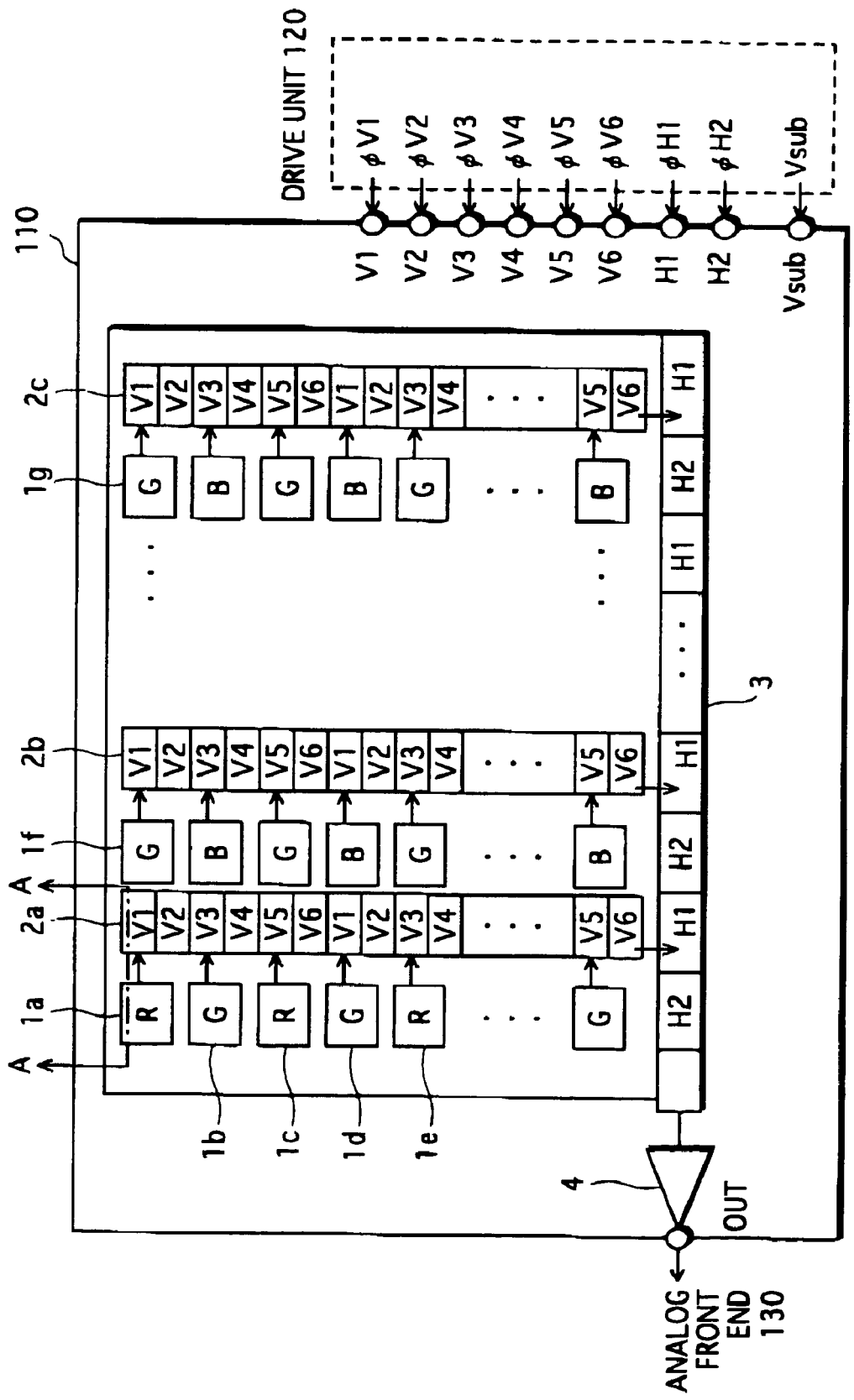
FIG. 2 shows a planar structure of an imaging device 110.

FIG. 2 shows a planar view of the structure of the imaging device 110.

The imaging device 110 is a CCD image sensor that uses an interline transfer method. A photoelectric conversion unit 1 generates charges according to an amount of exposure to light (hereinafter called an "exposure amount") Photoelectric converters 1a, 1b, and so on, are arranged in a matrix on a semiconductor substrate. Vertical CCDs 2a, 2b, etc. transfer charges vertically according to six types of driving signals: φV1 to φV6. The vertical CCDs 2a, 2b, etc. are arranged between columns of the photoelectric conversion unit 1. A horizontal CCD 3 is a general two-phase CCD, and transfers charges horizontally according to two types of drive signals: φH1 and φH2.

Accordingly, charges accumulated in each of the photoelectric converters are successively transferred by the vertical CCDs and the horizontal CCD to an amplifier 4. The amplifier 4 generates a signal based on the received charges, amplifies the generated signal, and outputs the amplified signal via an out terminal to the analog front end 130.

Note that "R", "G", and "B" shown on the photoelectric converters indicate the type of color filter provided on the photoelectric surface of the respective pixel. Here, the Bayer pattern is employed for arranging the color filters.

Furthermore, "V1", "V2", through to "V6" shown on the vertical CCDs indicate the type of drive signal applied to each area. For example, a drive signal φV1 is applied to each area in which "V1" is shown. Similarly, "H1" and "H2" shown on the horizontal CCD indicate the type of drive signal applied to each area.

The drive signals applied to the vertical CCDs, and the horizontal CCD are supplied by the drive unit 120 via terminals V1 to V6 and terminals H1 and H2.

Furthermore, a substrate voltage Vsub is applied to the semiconductor substrate of the imaging device 110.

The waveforms shown by the drive signals "φV1" to "φV6", "φH1" and "φH2", and "Vsub" differ between individual mode and combination mode.

The drive signals "φV1" to "φV6" have three possible values "Low", "Mid", and "High". "High" is applied only when reading charges from the photoelectric conversion unit 1 to the vertical CCDs. "Low" and "Mid" are applied alternately when the vertical CCDs transfer charges For example, φV1 is "High" when the vertical CCD 2a reads charges from the photoelectric converter 1a, and φV3 is "High" when the vertical CCD 2a reads charges from the photoelectric converter 1b. Note that since φV1 is also applied to the photoelectric converters 1d, 1f, 1g, and soon in parallel, if φV1 is "High", charges from every third row of photoelectric converters, specifically, the row to which the photoelectric converter 1a belongs, the row to which the photoelectric converter 1d belongs, and so on, will be read by the vertical CCDs.

Figure 3:
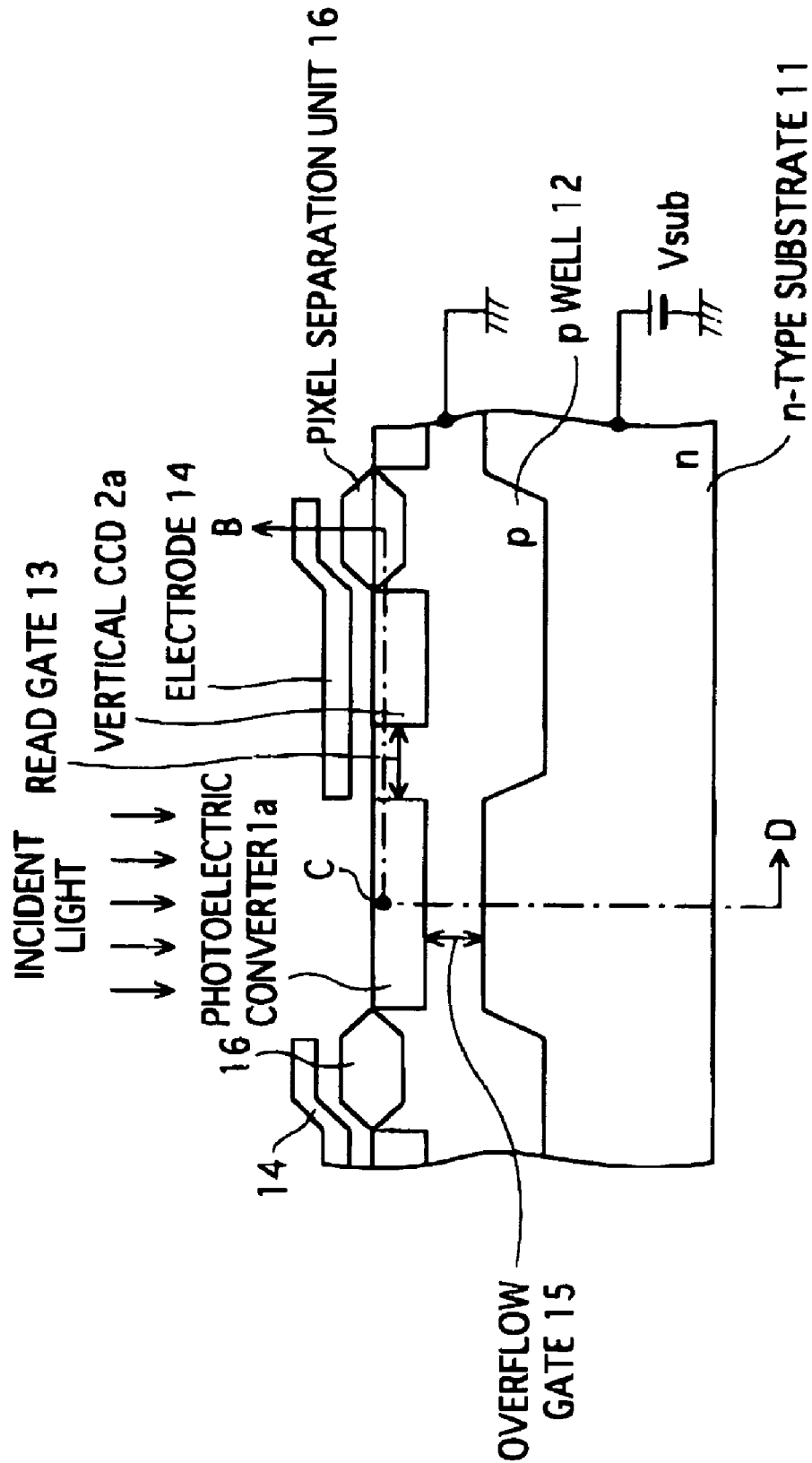
FIG. 3 shows a cross section of a photoelectric converter 1*a* and a vertical CCD 2*a* on a line A-A in FIG. 2.

FIG. 3 shows a cross section of the photoelectric converter 1a and the vertical CCD 2a along a line A-A in FIG. 2.

As shown in FIG. 3, a p well 12 is formed in an upper part of an n-type substrate 11, and the photoelectric converter 1a and the vertical CCD 2a are formed in the p well 12. An electrode 14 is further formed above the p well 12. The electrode 14 serves as an electrode for controlling reading from the photoelectric converter 1a and a transfer electrode for transferring to the vertical CCD. A pixel separation unit 16 is an area that electrically separates neighboring pixels.

On receiving incident light, the photoelectric converter 1a generates charges according to an amount of the incident light.

A drive signal φV1 consisting of voltage of three values (Low, Mid, High) is applied to the electrode 14, and when "High" is applied, the charges in the photoelectric converter 1a are read to the vertical CCD 2a via the read gate 13. The overflow gate 15 is controlled by the substrate voltage Vsub that is applied to the n-type substrate 11.

Figure 4:
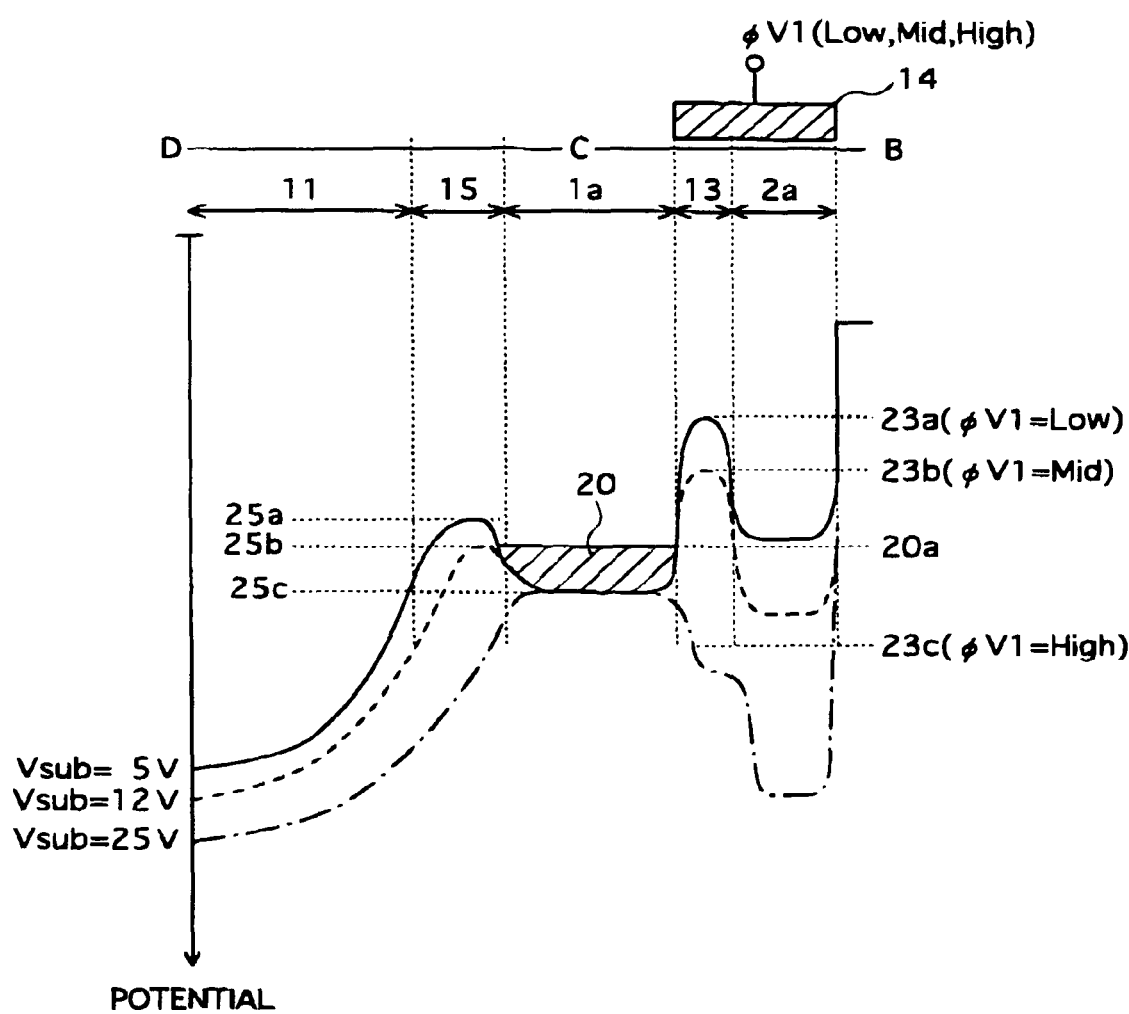
FIG. 4 shows potential distribution along a line B-C-D in FIG. 3.

FIG. 4 shows distribution of potential along a line B-C-D in FIG. 3.

In FIG. 4, the vertical axis indicates potential and the horizontal axis indicates position. Note that the horizontal axis shows position in a horizontal direction between B and C, and position in a vertical direction between C and D. Furthermore, "11", "15", "1a", "13", and "2a" in the upper part of the drawing correspond respectively to reference numbers in FIG. 3.

As can be seen from FIG. 4, the potential 23a of the read gate 13 and the potential 25a of the overflow gate 15 form a well potential that acts as a barrier.

Charges (electrons) 20 generated by the photoelectric converter 1a are accumulated in the well potential.

The potential of the read gate 13 and the vertical CCD 2a changes according to the drive signal φV1 (=Low, Mid, High) applied to the electrode 14.

In FIG. 4, 23a indicates the potential of the read gate 13 when φV1=Low, 23b indicates the potential of the read gate 13 when φV1=Mid, and 23c indicates the potential of the read gate 13 when φV1=High. The charges accumulated in the photoelectric converter 1a are read to the vertical CCD 2a only when φV1=High.

Furthermore, 25a indicates the potential of the overflow gate 15 when the substrate voltage Vsub=5V, 25b indicates the potential of the overflow gate 15 when the substrate voltage Vsub=12V, and 25c indicates the potential of the overflow gate 15 when the substrate voltage Vsub=25V.

Charges generated by the photoelectric converter 1a are gradually accumulated over time at the well potential, and the potential 20a drops (in FIG. 4, 20a moves upward). Then, when charges are excessively generated, the excessive charges are drained over the overflow gate 15 to the n-type substrate 11. In other words, the saturation amount of the charges that can be accumulated in the photoelectric converter 1a is able to be set according to the substrate voltage Vsub. Therefore, blooming, which is overflow of excessive charges in the vertical CCD 2a, can be controlled by setting the substrate voltage Vsub appropriately.

Here, the appropriate value for the substrate voltage Vsub (the saturation amount of charges in the photoelectric converter 1a) can be determined according to the maximum amount of charges that the vertical CCDs and the horizontal CCDs can transfer. In the case of individual mode, the saturation amount of charges in the photoelectric converter 1a should be set to be equivalent to or less than the CCD maximum transfer amount. In the case of combination mode, the saturation amount of charges in the photoelectric converter 1a should be reduced in accordance with the number of charges that are to be added together. For example, if charges of nine photoelectric converters are to be added together, the saturation amount of charges in each photoelectric converter may be set to one ninth of that in individual mode.

The overflow gate 15 has a reset function for draining all charges accumulated in the photoelectric converter 1a to the n-type substrate 11 (when Vsub=25V). The appropriate value for the substrate voltage Vsub is a voltage that enables the potential of the overflow gate 15 to be equal to or greater than potential at the bottom of the well potential.

In the present embodiment, the substrate voltage Vsub is set to 5V in individual mode and to 12V in combination mode according to the described method. In addition, the substrate voltage Vsub is set to 25V when utilizing the reset function.

The following describes the circuit with which the drive unit 120 to generate the drive signal, and in particular the circuit with which the drive unit 120 generates the substrate voltage Vsub.

Figure 5A:
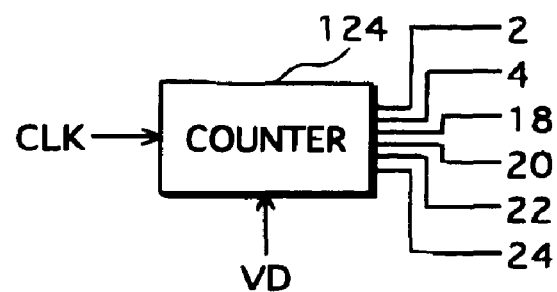
FIGS. 5A and 5B show a circuit with which a drive unit 120 generates a substrate voltage Vsub.
Figure 5B:
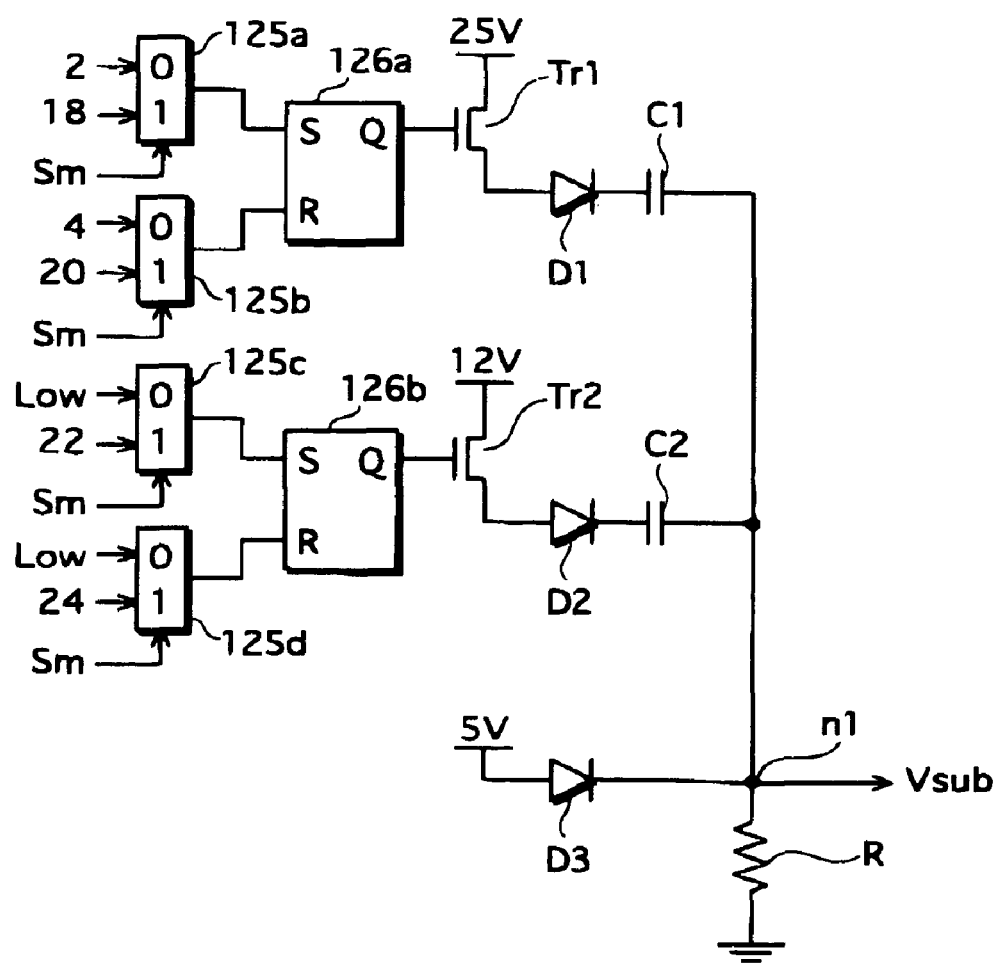

FIGS. 5A and 5B show the circuit with which the drive unit 120 generates the substrate voltage Vsub.

FIG. 5A shows a counter.

The counter 124 is provided internally in the drive unit 120. The counter 124 counts clock signals (CLK) from the synchronization signal generation unit 142, and at predetermined count values (2, 4, 18, 20, 22, and 24), outputs a High level signal from each output terminal. The counter 124 resets on the rising edge of the vertical synchronization signal (VD).

FIG. 5B shows a Vsub output circuit.

In FIG. 5A, 125a to 125d are 2-input 1-output selectors which switch output based on the mode select signal (Sm) from the control unit 143. Here, "2" and "18" that are shown being input into the selector 125a denote output terminals of the counter 124 (this is the same for the numbers being input into the other selectors). The mode select signal indicates individual mode when "0" and combination mode when "1".

Furthermore, 126a and 126b are latch circuits which output a High level signal from an output terminal (Q) during a period from a High level signal being input into a set terminal (S) to a High level signal being input into a reset terminal (R). The latch circuits 126a and 126b output a low level signal at other times.

Tr1 and Tr2 are switching transistors which conduct when the latch circuits 126a and 126b output a High level signal, and do not conduct when the latch circuits 126a and 126b output a low level signal.

D1, D2, and D3 are diodes that prevent backflow of current caused by unexpected voltage. C1 and C2 are capacitors for outputting only pulse components, and R is a ground resistor.

The following describes timing in driving of the imaging device.

Figure 6:
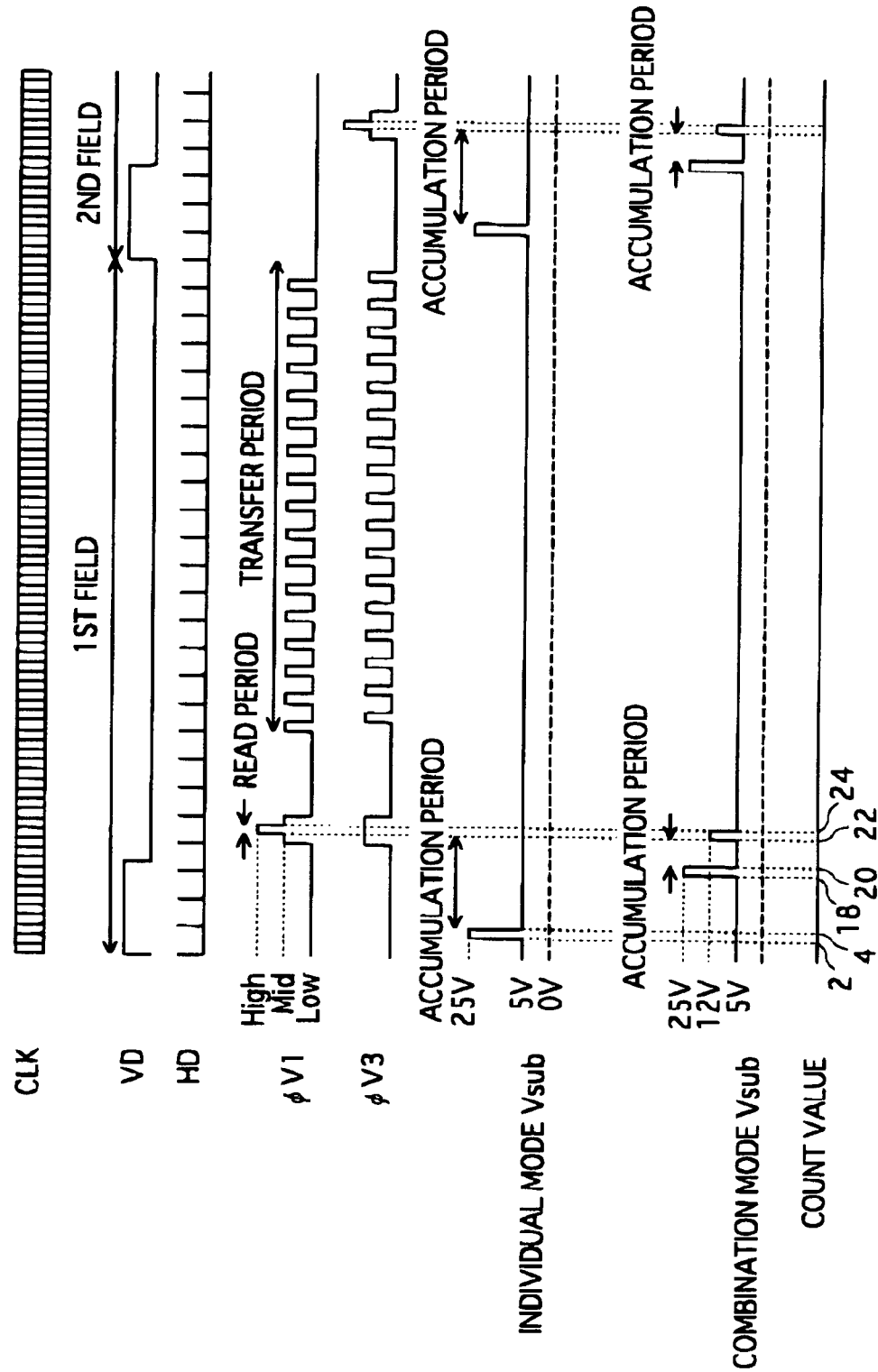
FIG. 6 shows driving timing of the imaging device.

FIG. 6 shows timing in driving of the imaging device.

CLK, VD, and HD are signals generated by the synchronization signal generation unit 142 and input into the drive unit 120.

CLK is a clock signal of 12 MHz, for example.

VD is a vertical synchronization signal generated by dividing the clock signal. The drive unit 120 completes transfer of all columns of vertical CCDs during one VD period.

HD is a horizontal synchronization signal generated by dividing the clock signal. The drive unit 120 completes transfer of all rows of horizontal CCDs during one HD period.

Furthermore, φV1, φV3, and Vsub are three of the nine types of drive signals that the drive unit 120 generates. A description of the other drive signals generated by the drive unit 120, specifically φV2, φV4, φV5, φV6, φH1, and φH2, is omitted here.

The driving signal φV1 is for driving the read gate 13 and the vertical CCDs, and the voltage pulse thereof has three values (Low, Mid, High).

As already described using FIG. 4, when φV1=High, the potential of the read gate 13 rises to 23c, and charges that have accumulated in the photoelectric conversion unit 1 are read to the vertical CCDs. The read period commences on the rising edge on which φV1 reaches High. Subsequently, charges read to the vertical CCDs are transferred vertically and reaches the horizontal CCD by φV1 to φV6 repeatedly alternating between Low and Mid. After being conveyed to the horizontal CCD, the charges are transferred horizontally, and output to the analog front end 130 as a signal.

The driving signal Vsuh is for driving the overflow gate 15, and has three pulse values: 5V, 12V, and 25V. Furthermore, the driving timing and waveform of Vsub differs between individual mode and combination mode. The feature of the present embodiment lies in this point.

Vsub is normally 5V in individual mode, but reaches 25V at the point at which when the count value is 2. This activates the reset function, and all charges that are accumulated in the photoelectric converters is drained to the n-type substrate 11. Vsub subsequently returns to 5V at the point at which the count value is 4. The period from the point at which the count value is 4 through to the point at which the count value is 22 is the accumulation period. Charges that are generated and accumulated in the photoelectric converters during this accumulation period is read to the vertical CCDs and the horizontal CCD, transferred, and output as a signal.

The reset function is activated later in combination mode than in individual mode, with Vsub reaching 25V at the point at which the count value is 18 and returning to 5V at the point at which the count value is 20. This means that the accumulation period is shorter in combination mode than in individual mode, and that the photoelectric converters generate and accumulate less charges during combination mode.

Here, the accumulation period is shortened in combination mode compared to in individual mode in accordance with the number of charges that are to be added together. For example, if charges from nine photoelectric converters are to be added together, the accumulation period in combination mode is one ninth that of individual mode.

Furthermore, in combination mode, Vsub is 12V from the point at which the count value is 22 to the point at which the count value is 24. This period is synchronized with the period during which φV1 is High. In other words, while the charges in the photoelectric converters are being read to the vertical CCDs, the saturation amount of charges in the photoelectric converters is one ninth of that in individual mode.

In this way, in the present embodiment, the drive unit 120 reduces the saturation amount in the read period in combination mode to be less than that in individual mode, and reduces the accumulation period to be shorter in combination mode than in individual mode. Here, the driving unit 120 is controlling blooming in two aspects.

One aspect is reducing the upper limit of charges that can be accumulated in the pixels in combination mode compared to individual mode. This prevents excessive charges being read to the vertical CCDs in combination mode even if a strong spot light is incident upon the imaging device 110, because the upper limit of charges that can be accumulated in each pixel is lowered.

The other aspect is controlling the amount of charges that are generated in the pixels in combination mode compared to individual mode. This prevents excessive charges being generated in combination mode even if a strong spot light is incident upon the imaging device 110, because the accumulation period during which charges are accumulated in the pixels is shortened.

According to the two stated aspects, the drive unit 120 controls charges overflowing in the vertical CCDs, in other words controls blooming.

Note that in the present embodiment, in combination mode the substrate voltage Vsub is 12V only during the read period. During the accumulation period, the substrate voltage Vsub is 5V, as in individual mode.

The drive unit 120 is also able to set the saturation amount of the well potential by applying different substrate voltages Vsub to the n-type substrate 11. However, the shape of the well potential also changes when different substrate voltages Vsub are applied to the n-type substrate 11, and consequently, spectral properties of the pixels also change. Such changes in spectral properties adversely affect image color reproduction properties.

For this reason, in the present embodiment, the drive unit 120 makes the saturation amount during the accumulation period equal in individual mode and combination mode, thereby maintaining spectral properties of the imaging device and achieving favorable color reproduction properties.

Note that spectral properties can be sufficiently maintained if the substrate voltage Vsub is equal during the accumulation period in individual mode and combination mode. In the present embodiment, the point at which the drive voltage $\phi$V1 changes from High to Mid (count value 24), and the point at which the substrate voltage Vsub changes from 12V to 5V (count value 24) are the same for this reason, but are not limited to being so. For example, the point at which the substrate voltage changes from 12V to 5V may be later than the count value 24, or the substrate voltage may be maintained at 12V until the next accumulation period commences.

Second Embodiment

Overview

Similar to the first embodiment, the driving apparatus of the second embodiment lowers the saturation amount of charges that can be accumulated in each pixel in combination mode compared to individual mode, and also shortens the accumulation period for which charges are generated and accumulated in the pixels in combination mode compared to individual mode, However, while a reset function of the substrate voltage Vsub is used to shorten the accumulation time in the first embodiment, a mechanical shutter is used in the second embodiment.

<Structure>

Figure 7:
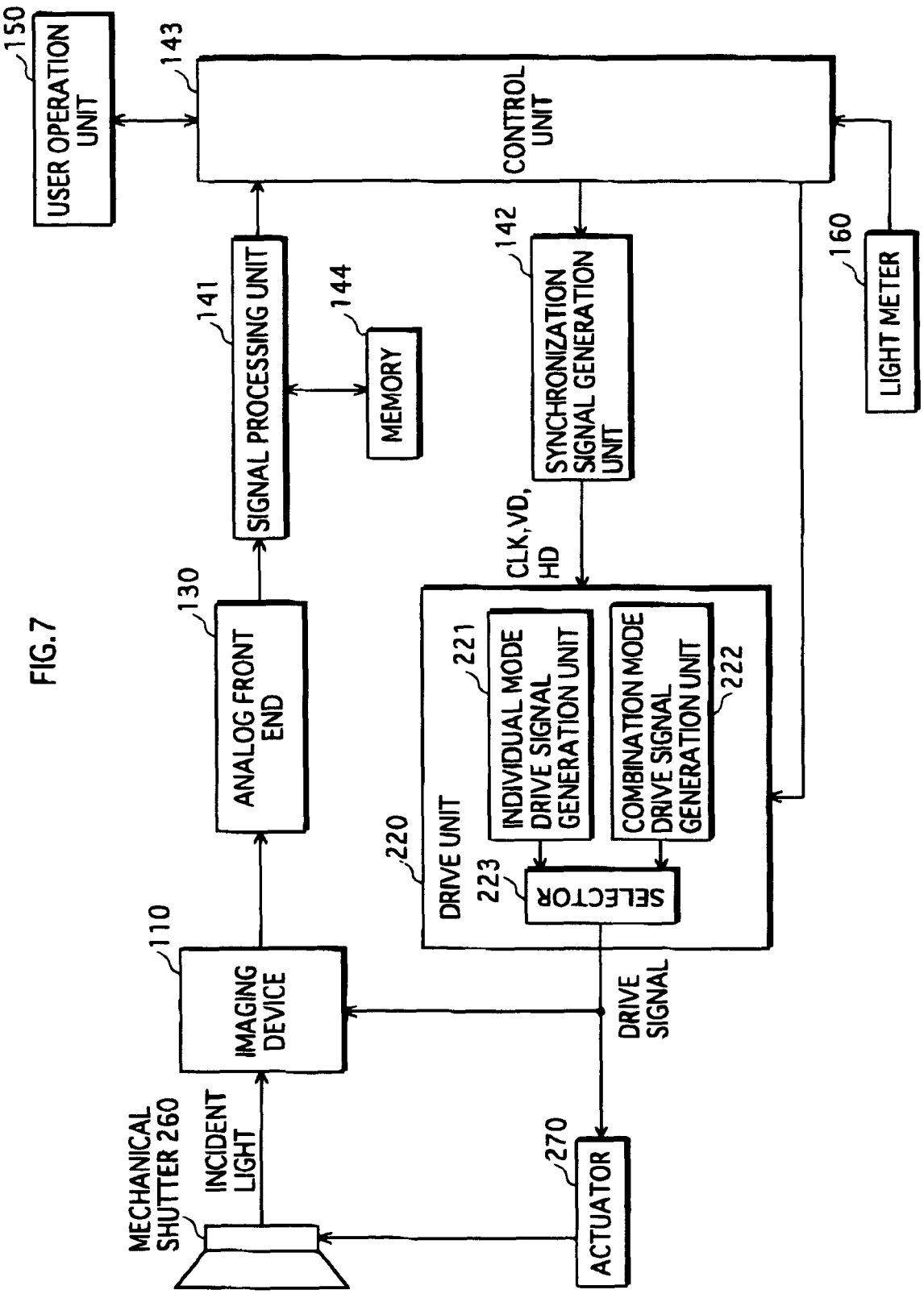
FIG. 7 shows the overall structure (imaging apparatus) of an imaging device, and a driving apparatus therefor, of a second embodiment of the present invention.

FIG. 7 shows the overall structure (imaging apparatus) of the imaging device, and the driving apparatus therefor, of the second embodiment.

The driving apparatus of the second embodiment has a mechanical shutter (hereinafter simply referred to as a shutter) 260 and an actuator 270 in addition to the structure of the first embodiment. Furthermore, the functions of a driving unit 220 differ to those of the driving unit 120 of the first embodiment due to the addition of the shutter 260 and the actuator 270. Other structure is the same as in the first embodiment, and is given identical numbering. Such identical structure is omitted from the following description.

The shutter 260 is a mechanical shutter, and opens and closes according to driving by the actuator 270. The shutter 260 passes incident light to the imaging device 110 when in an open state, and blocks incident light when in a closed state.

The actuator 270 opens and closes the shutter 260 according to a drive signal Sd supplied by the drive unit 220. Specifically, the actuator 270 puts the shutter 260 into the open state when the level of the drive signal Sd is High, and puts the shutter 260 into the closed state when the level of the drive signal Sd is Low.

In addition to the functions of the drive unit 120 of the first embodiment, the drive unit 220 has a function of generating and outputting the drive signal Sd.

Figure 8A:
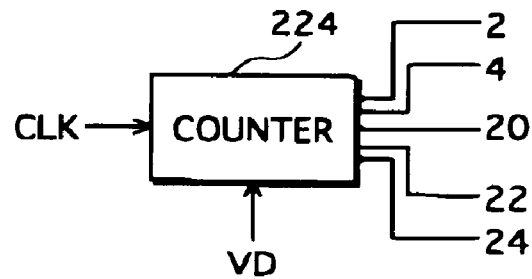
FIGS. 8A, 8B, and 8C shows a circuit with which a drive unit 220 generates a substrate voltage Vsub and a drive signal Sd.
Figure 8B:
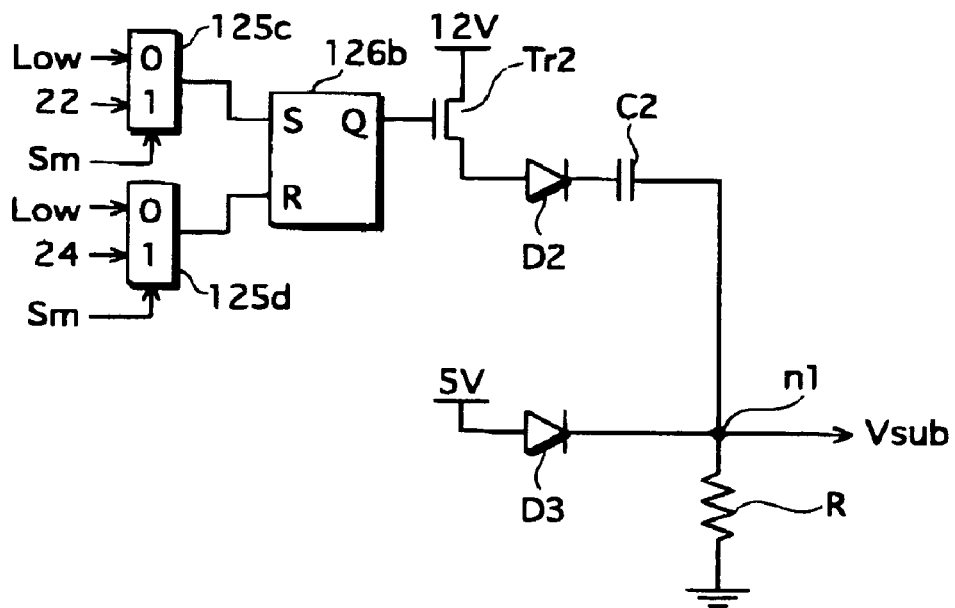
Figure 8C:
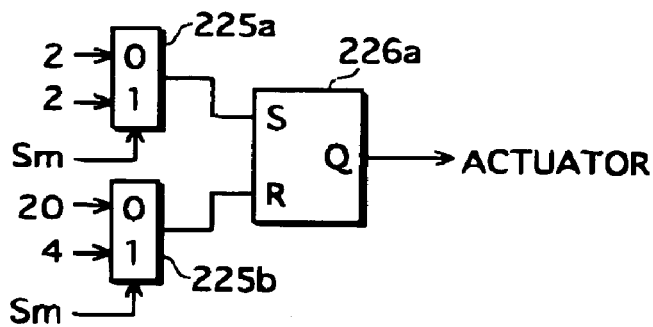

FIGS. 8A to 8C show the circuits with which the drive unit 220 generates the substrate voltage Vsub and the drive signal Sd.

FIG. 8A shows a counter.

The counter 224 is provided internally in the drive unit 220. The counter 224 counts clock signals (CLK) from the synchronization signal generation unit 142, and at predetermined count values (2, 4, 20, 22, and 24), outputs a High level signal from each output terminal. The counter 224 resets on the rising edge of the vertical synchronization signal (VD).

FIG. 8B shows a circuit with which the drive unit 220 outputs the substrate voltage Vsub.

The block for outputting 25V in the output circuit shown in FIG. 5B is omitted from the substrate voltage Vsub output circuit of the present embodiment because the reset function is unnecessary.

FIG. 8C shows a circuit with which the drive unit 220 outputs the drive voltage Sd.

In FIG. 8C, 225a and 225b are 2-input 1-output selectors which switch output based on the mode select signal from the control unit 143.

Furthermore, 226b is a latch circuit which outputs a High level signal from an output terminal (Q) during a period from a High level signal being input into a set terminal (S) to a High level signal being input into a reset terminal (R). The latch circuits 226b outputs a Low level signal at other times.

The following describes timing in driving of the imaging device.

Figure 9:
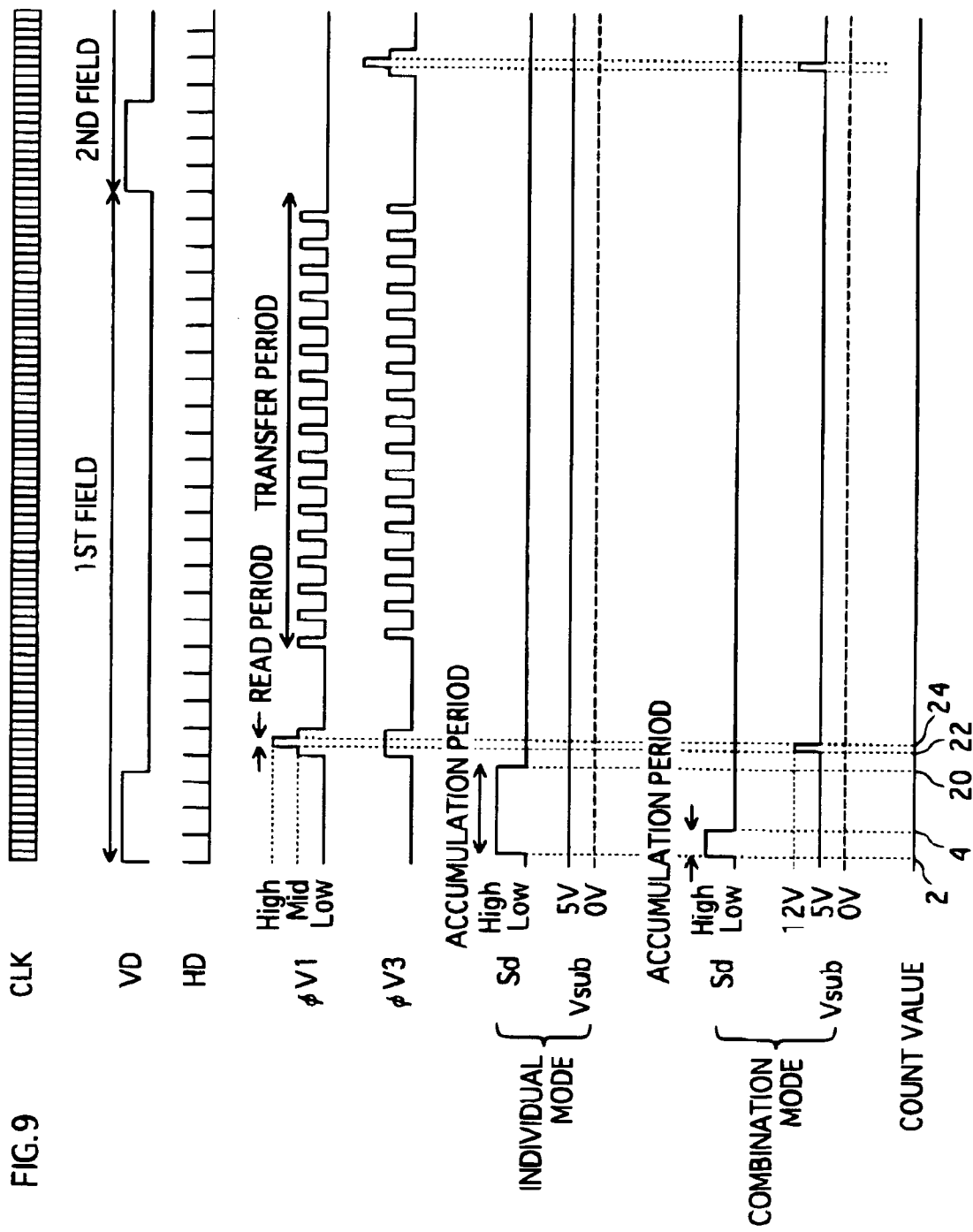
FIG. 9 shows driving timing of the imaging device.

FIG. 9 shows timing in driving of the imaging device.

CLK, VD, HD, $\phi$V1, and $\phi$V3 are the same as those shown in FIG. 6, and therefore a description thereof is omitted.

In individual mode, the drive signal Sd is High in a period from the point at which the count value is 2 to a point at which the count value is 20, and is Low at all other times. Vsub is 5V at all times.

In combination mode, the drive signal Sd is High in a period from the point at which the count value is 2 to a point at which the count value is 4, and is Low at all other times. Vsub is 12V is a period from the point where the count value is 22 to a point where the count value is 24, and is 5V at all other times.

In this way, the period for which the shutter 260 is in the open state in combination mode is short compared to individual mode. This is how the method used to shorten the accumulation period in the second embodiment differs from the first embodiment which uses a reset function to shorten the accumulation period.

Note that the read period commences at the point where the count value is 22 in both individual mode and combined mode in the present embodiment. This is to enable drive signals other than Vsub and Sd to be used in both individual mode and combination mode. Such common use of drive signals means that the internal circuit structure of the drive unit 220 can be relatively simple. However, if reading speed is to be given precedence over simplicity of circuit structure, the read period maybe commenced at the point at which the count value is 6, for example, which closely proceeds the end point of the accumulation period (count value 4).

Third Embodiment

Overview

The driving apparatus of the third embodiment reduces the saturation amount of charges that can be accumulated in each pixel in combination mode, compared to individual mode, as well as reducing the amount of light received by each pixel in combination mode. This enables the drive unit to control blooming in combination mode.

<Structure>

Figure 10:
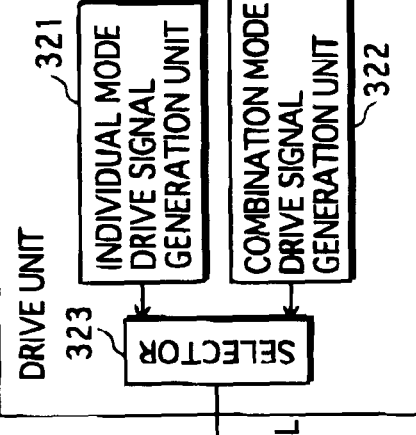
FIG. 10 shows the overall) structure (imaging apparatus) of an imaging device, and a driving apparatus therefor, of a third embodiment of the present invention.

FIG. 10 shows the overall structure (imaging apparatus) of the imaging device, and the driving apparatus therefor, of the third embodiment.

The driving apparatus of the third embodiment has an aperture 380 and an actuator 390 in addition to the structure of the first embodiment. Furthermore, the functions of a driving unit 320 differ to those of the driving unit 120 of the first embodiment due to the addition of the aperture 380 and the actuator 390. Other structure is the same as in the first embodiment, and is given identical numbering. Such identical structure is omitted from the following description.

The aperture 380 opens and closes according to driving by the actuator 390. The amount of light received by the imaging device 110 is adjusted by continuously changing the area of the opening of the aperture 380.

The actuator 390 opens and closes the aperture 380 according to a PWM (pulse width modulation) voltage supplied by the control unit 143. Specifically, the PWM voltage is a continuous voltage from 0V to 12V, and the actuator 390 puts the aperture 380 into a completely open state when the PWM voltage is 0V, and a completely closed state when the PWM voltage is 12V. The relationship between the area of the opening of the aperture 380 and the PWM voltage is either liner or non-linear, depending on the properties of the aperture 380 and the actuator 390.

The drive unit 320 has the functions of the drive unit 220 of the second embodiment, but with the omission of the function of generating and outputting the drive signal Sd.

FIG. 11 shows correspondence between the opening area and the accumulation period in each of individual mode and combination mode.

Note that this is based on the premise that charges of nine pixels are added together in combination mode.

As shown in FIG. 11, the opening area in combination mode is one ninth of that in individual mode. The accumulation period is equivalent in the two modes. The difference between the driving unit of the third embodiment and the driving units of the first and second embodiments lies in this point.

The amount of light incident on the imaging device 110 is reduced in combination mode by making the operating area of the aperture 380 one ninth of that in individual mode. This controls the amount of charges generated in each pixel.

Note that if the driving apparatus is provided with both a shutter and an aperture, the amount of exposure may be controlled by the combination of the shutter and the aperture. As shown in FIG. 12 as one example, in combination mode the exposure amount may be set to one ninth of that in individual mode by setting both the opening area and the accumulation period to one third of that in individual mode.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving apparatus for driving an imaging device that includes a plurality of pixels and a temporary charge storage area, each pixel generating charges depending on an amount of exposure, the driving apparatus driving the imaging device using a combination mode in which charges generated in a predetermined number of the pixels are read to the temporary charge storage area to be added together, the driving apparatus comprising:

a setting unit operable to set a saturation amount in an accumulation period to be equal to when an individual mode is used, the accumulation period being a period in which the pixels generate charges according to an amount of light received by each pixel, the saturation amount being an upper limit of charges that can be accumulated in each pixel, and the individual mode being a mode in which charges generated in each pixel are read to a temporary storage area, and change the saturation amount in a read period to be lower than when the individual mode is used, the read period consisting of a time period during which charges generated in the pixels are read to the temporary charge storage area; and a limitation unit operable to limit the amount of exposure to be lower than when the individual mode is used, wherein the read period and the accumulation period do not overlap, and the setting unit changes the saturation amount in the read period at a same time as a start timing of the read period.

2. The driving apparatus of claim 1, wherein
the setting unit sets the saturation amount such that charges obtained as a result of adding the charges of the predetermined number of pixels together do not exceed a maximum storage amount of the temporary charge storage area.

3. The driving apparatus of claim 2, wherein
the setting unit sets the saturation amount so as to be 1/n of the saturation amount when the individual mode is used, n being the predetermined number.

4. The driving apparatus of claim 1, wherein
the pixels are formed in a semiconductor substrate, and have an overflow drain structure by which charges generated in excess of the saturation amount are drained to the semiconductor substrate, the saturation amount is set such that the lower a substrate voltage provided to the semiconductor substrate is, the higher the saturation amount is, and the setting unit sets the substrate voltage to be higher than when the individual mode is used.

5. The driving apparatus of claim 1, wherein the amount of exposure corresponds to a value of an amount of received light integrated in the accumulation period, and the limitation unit limits the accumulation period to be shorter than when the individual mode is used.

6. The driving apparatus of claim 5, wherein the limitation unit includes:

a storage sub-unit operable to store information indicating an accumulation time period that is shorter than when the individual mode is used;

a reset sub-unit operable to drain all charges from the pixels; and a read sub-unit operable to read, to the temporary charge storage area, charges generated in the pixels after the accumulation time period indicated by the information stored in the storage sub-unit has elapsed from when the reset sub-unit drains the charges.

7. The driving apparatus of claim 5, wherein the limitation unit includes:

a storage sub-unit operable to store information indicating an accumulation time period that is shorter than when the individual mode is used; and a mechanical shutter that opens only for the accumulation time period indicated by the information stored in the storage sub-unit, to allow the pixels to receive light.

8. The driving apparatus of claim 1, wherein the amount of exposure corresponds to a value of an amount of received light integrated in the accumulation period, and the limitation unit limits the amount of light received to be lower than when the individual mode is used.

9. The driving apparatus of claim 8, wherein the limitation unit includes:

a storage sub-unit operable to store information indicating an opening rate that is lower than an opening rate when the individual mode is used; and an aperture construction that opens to an extent corresponding to the opening rate indicated by the stored information, to allow the cells to receive light.

10. The driving apparatus of claim 1, wherein the limitation unit sets the saturation amount to be 1/n of the saturation amount when the individual mode is used, n being the predetermined number.

11. A driving method for driving an imaging device that includes a plurality of pixels and a temporary charge storage area, each pixel generating charges depending on an amount of exposure, the driving method driving the imaging device using a combination mode in which charges generated in a predetermined number of the pixels are read to the temporary charge storage area to be added together, the driving method comprising:

a setting step of setting a saturation amount in an accumulation period to be equal to when an individual mode is used, the accumulation period being a period in which the pixels generate charges according to an amount of light received by each pixel, the saturation amount being an upper limit of charges that can be accumulated in each pixel, and the individual mode being a mode in which charges generated in each pixel are read to a temporary storage area, and changing the saturation amount in a read period to be lower than when the individual mode is used, the read period consisting of a time period during which charges generated in the pixels are read to the temporary charge storage area; and a limitation step of limiting the amount of exposure to be lower than when the individual mode is used, wherein the read period and the accumulation period do not overlap, and in the setting step, changing the saturation amount in the read period at a same time as a start timing of the read period.

12. The driving method of claim 11, wherein the setting step sets the saturation amount such that charges obtained as a result of adding the charges of the predetermined number of pixels together do not exceed a maximum storage amount of the temporary charge storage area.

13. The driving method of claim 12, wherein the setting step sets the saturation amount so as to be 1/n of the saturation amount when the individual mode is used, n being the predetermined number.

14. The driving method of claim 11, wherein the pixels are formed in a semiconductor substrate, and have an overflow drain structure by which charges generated in excess of the saturation amount are drained to the semiconductor substrate, the saturation amount is set such that the lower a substrate voltage provided to the semiconductor substrate is, the higher the saturation amount is, and the setting step sets the substrate voltage to be higher than when the individual mode is used.

15. The driving method of claim 11, wherein the amount of exposure corresponds to a value of an amount of received light integrated in the accumulation period, and the limitation step limits the accumulation period to be shorter than when the individual mode is used.

16. The driving method of claim 15, wherein the limitation step includes:

a reset sub-step of draining all charges from the pixels; and a read sub-step of reading, to the temporary charge storage area, charges generated in the pixels after an accumulation time period has elapsed from when the reset sub-step drains the charges, the accumulation period being shorter than an accumulation time period when the individual mode is used.

17. The driving method of claim 15, wherein the pixels receive light that has passed through a mechanical shutter, and the limitation step opens the mechanical shutter only for an accumulation time period that is shorter than an accumulation time period when the individual mode is used.

18. The driving method of claim 11, wherein the amount of exposure corresponds to a value of an amount of received light integrated in the accumulation period, and the limitation step limits the amount of light received to be lower than when the individual mode is used.

19. The driving method of claim 18, wherein the pixels receive light that has passed through an aperture construction, and the limitation step adjusts the aperture construction so that an opening rate thereof is less than an opening rate thereof when the individual mode is used.

20. The driving method of claim 11, wherein
the limitation step sets the saturation amount to be 1/n of the saturation amount when the individual mode is used, n being the predetermined number.

21. An imaging apparatus that generates charges in each of a plurality of pixels depending on an amount of exposure, and generates image data from the charges in each of the pixels, comprising:
an imaging device that comprises the plurality of pixels;
a driving apparatus that drives the imaging device using either of two reading modes, one of the reading modes being an individual mode in which charges generated in each of the pixels is read individually and the other of the reading modes being a combination mode in which charges of a predetermined number of pixels among the plurality of pixels are read to be added together;
a signal processing unit operable to generate image data in accordance with charges read from the imaging device in either of the reading modes; and
a control unit operable to select one of the individual mode and the combination mode for the driving apparatus, in accordance with an input signal,
wherein, the driving apparatus includes:
a setting unit operable to set a saturation amount in an accumulation period to be equal to when an individual mode is used, the accumulation period being a period in which the pixels generate charges according to an amount of light received by each pixel, the saturation amount being an upper limit of charges that can be accumulated in each pixel, and the individual mode being a mode in which charges generated in each pixel are read to a temporary storage area, and
operable to change the saturation amount in a read period to be lower when the combination mode is used than when the individual mode is used, the read period consisting of a time period during which charges generated in the pixels are read to a temporary charge storage area, the saturation amount being an upper limit of charges that can be accumulated in each pixel; and
a limitation unit operable to limit the amount of exposure to be lower when the combination mode is used than when the individual mode is used,
wherein the read period and the accumulation period do not overlap, and
the setting unit changes the saturation amount in the read period at a same time as a start timing of the read period.

22. The imaging device of claim 21, wherein
the setting unit sets the saturation amount such that charges obtained as a result of adding the charges of the predetermined number of pixels together do not exceed a maximum storage amount of the temporary charge storage area.

23. The imaging device of claim 22, wherein
the setting unit sets the saturation amount so as to be 1/n of the saturation amount when the individual mode is used, n being the predetermined number.

24. The imaging device of claim 21, wherein
the pixels are formed in a semiconductor substrate, and have an overflow drain structure by which charges generated in excess of the saturation amount are drained to the semiconductor substrate,
the saturation amount is set such that the lower a substrate voltage provided to the semiconductor substrate is, the higher the saturation amount is, and
the setting unit sets the substrate voltage to be higher than when the individual mode is used.

25. The imaging device of claim 21, wherein
the amount of exposure corresponds to a value of an amount of received light integrated in the accumulation period, and
the limitation unit limits the accumulation period to be shorter than when the individual mode is used.

26. The imaging device of claim 25, wherein
the limitation unit includes:
a storage sub-unit operable to store information indicating an accumulation time period that is shorter than when the individual mode is used;
a reset sub-unit operable to drain all charges from the pixels; and
a read sub-unit operable to read, to the temporary charge storage area, charges generated in the pixels after the accumulation time period indicated by the information stored in the storage sub-unit has elapsed from when the reset sub-unit drains the charges.

27. The imaging device of claim 25, wherein
the limitation unit includes:
a storage sub-unit operable to store information indicating an accumulation time period that is shorter than when the individual mode is used; and
a mechanical shutter that opens only for the accumulation time period indicated by the information stored in the storage sub-unit, to allow the pixels to receive light.

28. The imaging device of claim 21, wherein
the amount of exposure corresponds to a value of an amount of received light integrated in the accumulation period, and
the limitation unit limits the amount of light received to be lower than when the individual mode is used.

29. The imaging device of claim 28, wherein
the limitation unit includes:
a storage sub-unit operable to store information indicating an opening rate that is lower than an opening rate when the individual mode is used; and
an aperture construction that opens to an extent corresponding to the opening rate indicated by the stored information, to allow the cells to receive light.

30. The imaging device of claim 21, wherein
the limitation unit sets the saturation amount to be 1/n of the saturation amount when the individual mode is used, n being the predetermined number.

* * * * *